United States Patent [19]

Kimmich et al.

[11] Patent Number: 5,678,012

[45] Date of Patent: Oct. 14, 1997

[54] METHOD AND SYSTEM FOR SELECTING A VIDEO PIECE FROM A DATABASE

[75] Inventors: Jon B. Kimmich, Bellevue; Jeffrey Aaron Lubetkin, Seattle; Jonathan N. Sposato, Isaquah, all of Wash.

[73] Assignee: Microsoft Corporation, Redmond, Wash.

[21] Appl. No.: 435,373

[22] Filed: May 5, 1995

[51] Int. Cl.⁶ .................................................. G06F 3/00
[52] U.S. Cl. .................. 395/327; 395/968; 395/328
[58] Field of Search ............................ 395/155, 159, 395/161, 327, 348; 348/7

[56] References Cited

U.S. PATENT DOCUMENTS

| | | | |
|---|---|---|---|
| 5,434,678 | 7/1995 | Abecassis | 358/342 |
| 5,524,195 | 6/1996 | Clanton, III et al. | 395/155 |
| 5,550,577 | 8/1996 | Verbiest et al. | 348/7 |
| 5,557,724 | 9/1996 | Sampat et al. | 395/327 |

*Primary Examiner*—Raymond J. Bayerl
*Assistant Examiner*—A. Katbab
*Attorney, Agent, or Firm*—Jones & Askew

[57] ABSTRACT

A system and method for selecting a video piece from an assortment of video pieces available over an interactive network uses a graphical interface in connection with a database on which each of the available video pieces is characterized by categories and by quantitative rating of criteria. The characterization of the video pieces by categories and quantitative criteria is based on the subject matter of the video pieces. The graphical interface displays control elements, icons and sliders that relate to the categories and quantitative criteria. By selecting icons and manipulating the sliders, the user can initiate a selection process that will select a video piece that relates to the users subject matter interest. The system and method is intended for children to use in selecting cartoons over an interactive network.

2 Claims, 7 Drawing Sheets

Fig_3

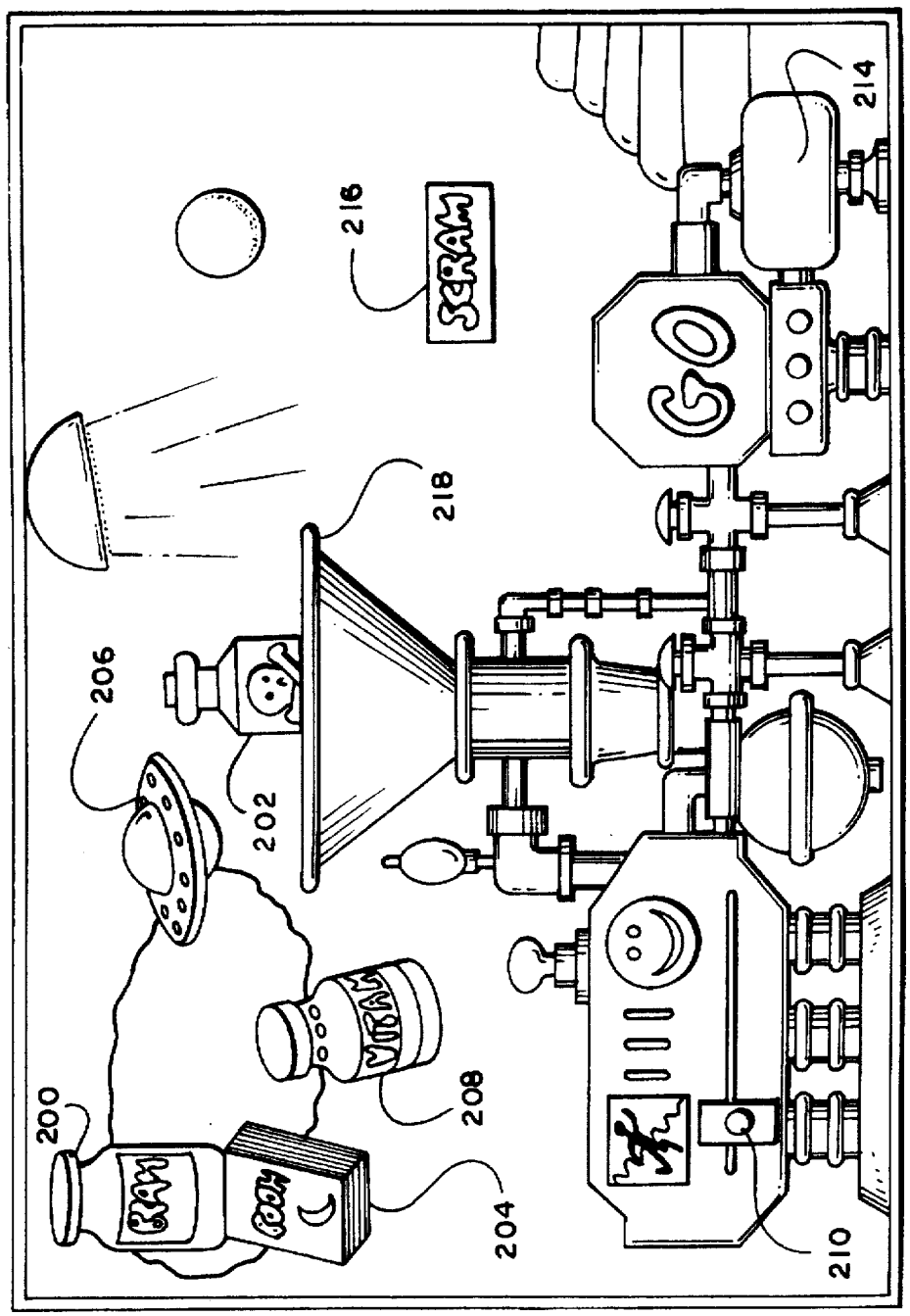
Fig_5

| CARTOON ID | CARTOON NAME | ELEMENT 1 | ELEMENT 2 | FUNNY LEVEL |
|---|---|---|---|---|
| 1 | JUMPIN' JUPITER | 0 | 3 | 2 |
| 2 | WATER, WATER EVERY HARE | 0 | 1 | 1 |
| 3 | BEWITCHED BUNNY | 1 | 2 | 2 |
| N | GENERIC CARTOON | 0 | 0 | 0 |

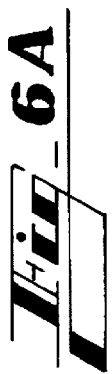

FIG. 6A

| ELEMENT ID | ELEMENT NAME | DESCRIPTION | GRAPHIC |
|---|---|---|---|
| 0 | BRAIN IN A JAR | DENOTES CARTOONS WILL MONSTERS | |
| 1 | VILLAIN POTION | DENOTES CARTOONS WITH EVIL VILLAINS | |
| 2 | FAIRY TALE BOOK | DENOTES CARTOONS BASED ON FAIRY TALES | |
| 3 | UFO | DENOTES OUTER SPACE CARTOONS | |
| 4 | MUSICAL VITAMINS | DENOTES CARTOONS WITH MUSICAL NUMBERS | |

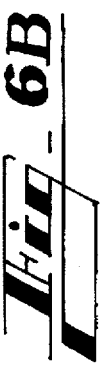

FIG. 6B

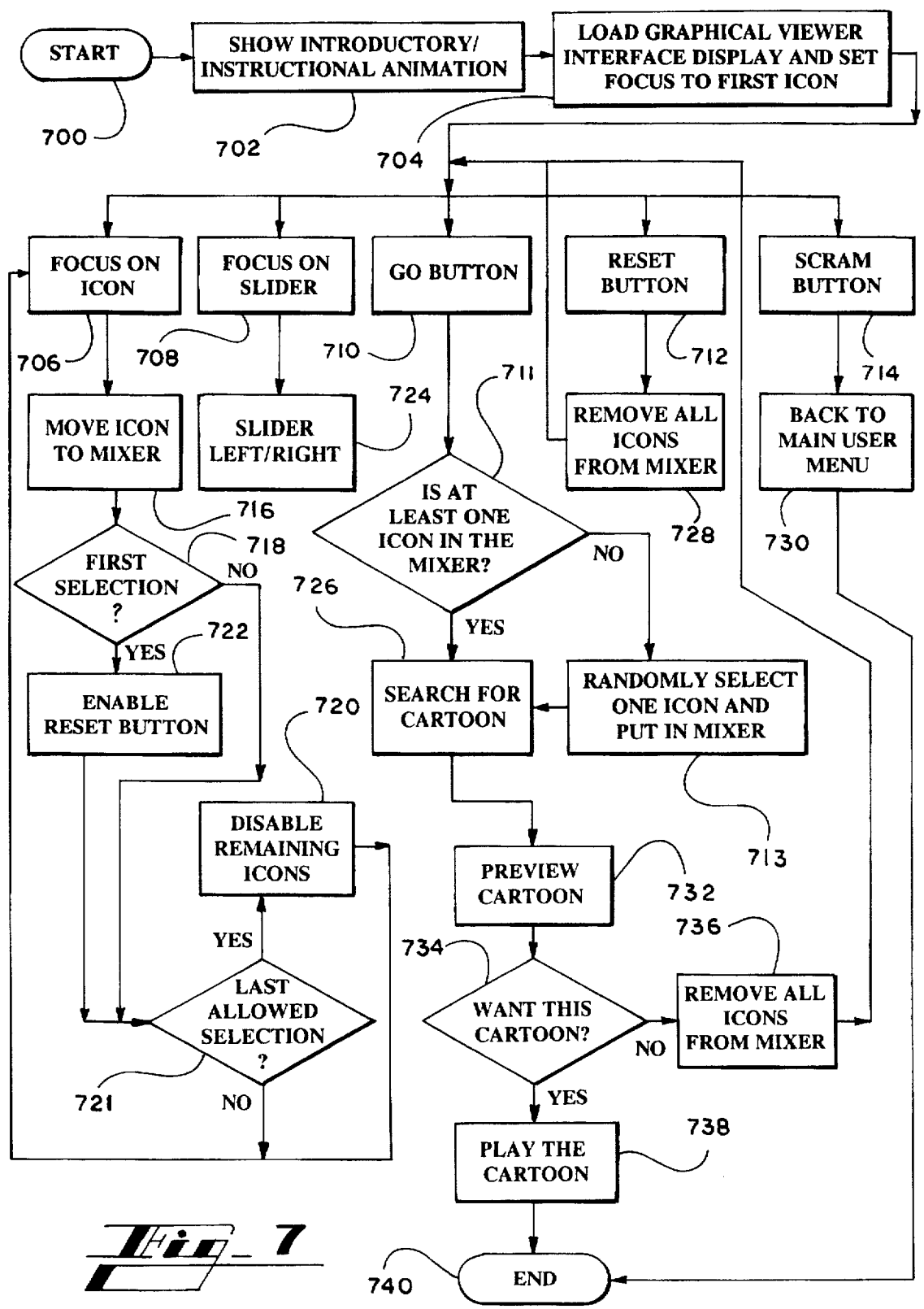
Fig_7

METHOD AND SYSTEM FOR SELECTING A VIDEO PIECE FROM A DATABASE

TECHNICAL FIELD

The present invention relates generally to the selection of items from a database and more particularly to a system and method for an interactive network which method and system use a graphical viewer interface to select video pieces, such as cartoons, from a database of video pieces subjectively characterized with respect to subject matter content.

BACKGROUND OF THE INVENTION

The expansion and improvement of cable television systems (sometimes referred to as community antenna television or CATV systems) have made it possible for cable companies to provide a variety of programming services to subscribers. These services typically include a multitude of television channels that are viewed on the subscriber's television.

Although CATV systems were originally designed to distribute television signals in the "downstream" direction only (i.e., from a central "headend" location to multiple subscriber locations, which is also known as the "forward" path), the advent of pay-per-view services and of other interactive television applications has fueled the development of bi-directional or "two-way" cable systems. These two-way cable systems also provide for the transmission of signals from the subscriber locations back to the headend via an "upstream" direction or a "reverse" path.

By upgrading conventional CATV systems to increase their bandwidth, cable service providers can use the additional channels gained by this wider bandwidth network to provide many new subscriber services. The ever-expanding deployment of fiber optic technology supports the implementation of an "interactive network" that allows a subscriber to obtain desirable services or programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include movies on demand, video on demand, or cartoons on demand, interactive music channels, interactive computing, shopping, entertainment, and other related services.

An interactive network makes it possible for subscribers to have immediate access to vast selections of video pieces. For example, video pieces may include movies, television programs, educational programs, cartoons, and innumerable other choices that may be available to subscribers via an interactive network. When video pieces are available via an interactive network, a subscriber must have a way to select the video pieces he or she would like to view. The computers that form a part of an interactive network may facilitate the selection of video pieces based on the title, artists, producer, or other identifier of the video pieces. The available video pieces may also be classified and searched by broad classifications such as humor, horror, educational, travel, etc. Such broad classifications, however, may result in long lists of video pieces through which the viewer must peruse in order to find video pieces of interest.

Because there will likely be a large assortment of video pieces readily available for viewing, the task of finding and selecting video pieces of interest becomes daunting. Unless the subscriber knows exactly what he or she wants by title, the selection process for a video piece becomes much like wandering through a huge video store with only broad categories identifying the collections of video tapes.

Even when a viewer has decided what type of video piece he or she wants, the viewer still may be at loss to determine the content of any particular video piece found on a list of video pieces of the same type. The difficulty of selecting a video piece over an interactive network becomes more challenging when the video pieces are cartoons, and the viewers are children. A child may only have a vague notion of what sort of cartoon he or she wants to watch. If confronted with a large assortment of cartoons from an interactive network, the child, without guidance, may select cartoons that are not of interest and may ultimately abandon the effort of selecting cartoons from the interactive network.

Moreover, a child intent on selecting a cartoon for viewing over an interactive network will likely be frustrated in his or her endeavor if the interface presented is text based. Traditional text-based methods of presenting content related information to viewers are particularly inadequate in a cartoons on demand context, where children are the typical viewers, for several reasons. First, many children cannot read quickly enough or with a sufficient vocabulary to be responsive to text-based information. Second, many of those children that read well enough to used text-based resources typically have very short attention spans and are therefore unable or unwilling to use text-based resources. Third, children typically require very simple navigation modes within an interface and may therefore be unable to navigate successfully through a typical manual or on-line help service. Fourth, cartoon character names and the titles of individual cartoon episodes are not effective selection tools because children often forget character names and do not ordinarily associate the title of a cartoon episode with its content. Fifth, a cartoon catalog must contain a large amount of content related information because individual cartoon episodes are generally relatively short.

Therefore, there is a need in the art for a system and method that allow a viewer to select a video piece from an assortment of video pieces available over an interactive network so that the selected video piece will conform to the viewer's expectations for the content of the selected video piece. Likewise, there is a need in the art for a system and method that allow a viewer, particularly a child, to select a video piece, particularly a cartoon, from an assortment of video pieces available over an interactive network by using a graphical viewer interface.

In particular, there is a need for a graphical viewer interface for children's programming in which simple and entertaining visual images and/or sounds connote the content of the programs available for selection, and convey control information regarding the operation of the interface. The methods for manipulating the interface for selecting a particular video piece for viewing, must be evident from the information presented by the interface itself, and must be simple enough for a child to use. Screen displays must be entertaining, and selection modes must be short and simple, to accommodate the short attention spans of children.

SUMMARY OF THE INVENTION

The present invention satisfies the above described needs by providing systems and methods that utilize a graphical viewer interface for selecting video pieces, such as cartoons, from an assortment of video pieces available over an interactive network based on subjectively characterizing the subject matter content of the available video pieces.

The interactive network which constitutes the environment for the present invention includes a server, a distribution network, an output device (television), and an input device (remote control). The method includes storing on the server an assortment of video pieces, such as cartoons, and storing a database of editorial data associated with each of the video pieces. The editorial data in the database characterizes the content of the available video pieces. Each of the video pieces is subjectively characterized based on the subject matter content of the video piece. Particularly, each video piece may be categorized with respect to whether it possesses one or more subject matter categories. For example, cartoons may be categorized in the database as having monsters, villains, fairy tales, etc. In addition, each video piece may be quantitatively characterized with respect to the level of one or more criteria. For example each cartoon in the database may be quantitatively rated as to its funny level, horror level, etc.

In one preferred embodiment, each video piece is categorized by the presence of two of five possible categories of subject matter (monsters, villains, fairy tales, outer space, and musical numbers). All of the listed categories (monsters, villains, fairy tales, outer space, musical numbers) should be considered examples, and the categories may vary based on the subject matter of the video pieces being characterized. In addition, each cartoon is characterized along a sliding scale that subjectively quantifies one or more criteria (the funny level, etc.) of the cartoon.

The system of the present invention also displays a graphical viewer interface that facilitates the selection of a video piece based on control elements. The displayed control elements include icon control elements that represent the categories used to characterize the content of the available video pieces, quantitative control elements (sliders, dials, and switches) that specify the quantitative rating for one or more criteria for the available video pieces, and button control elements that initiate the search process, reset the search process or terminate the selection service and send the viewer back to the next higher level of viewer interface.

For the icon control elements, the categories represented by the displayed icons are used to construct the database and thereby characterize the subject matter content of the video pieces. By using the input device (remote control), the viewer can select and activate one or more of the icons of the graphical viewer interface thereby indicating a preference in the selection process for a video piece that possessess that category of subject matter content represented by the icon control element. In one preferred embodiment of the present invention, five icons, each representing one of the subject matter categories, are displayed and may be selected and activated by the viewer manipulating the remote control. The only practical limit on the number of icons used to characterize the subject matter for the video pieces is the available display area on the screen.

For the quantitative control elements (sliders, dials, and switches), the quantitative ratings of subject matter criteria represented by the quantitative control elements are included in the database. The quantitative ratings are used in the database to characterize further the subject matter content of the video pieces. For a cartoon, a funny level slider may be displayed for manipulation by the viewer to indicate the desired quantitative funny level for the cartoon selection process.

In order to select a cartoon, the viewer activates two of the five icons on the graphical viewer interface and sets the funny control slider to the desired level. By manipulating the control elements (icons and slider), the viewer expresses his or her desire to view a cartoon that has those two categories of subject matter represented by the selected icons. Manipulation of the funny control indicates a preference for a cartoon that has the quantitative level of funniness specified by the funny level slider.

Based on the selection of category icons and the setting of the quantitative rating slider by the viewer, the system and method of the present invention search the database to find each cartoon that matches the input from the viewer and return one or more cartoons for viewing. In one preferred embodiment of the present invention, the graphical viewer interface gives the viewer the opportunity to review his or her control element selections and, if desired, to cancel the control element selections before the search for the cartoons is initiated. Also, if the search returns more that one cartoon, the system and method randomly pick one cartoon for viewing from the list of cartoons that were found by the search.

In accordance with the present invention, the system and method contemplate that n number of video pieces will be available over the interactive network. The video pieces will be categorized into m possible categories of subject matter content, and the viewer will be able to select x categories (x<m) in the selection process. In addition, the system and method contemplate using p quantitative criteria to rate each video piece and that each quantitative criteria will have y quantitative rating levels. In such a system, the database is set up as a table with n records, a record for each video piece that is available over the interactive network. Each video piece record includes an identification number for the video piece, the name of the video piece, x number entries, each of which identifies one of the m categories of subject matter found in the video piece, and p number entries for each of the quantitative ratings criteria. In one preferred embodiment used for cartoon selection, the system has 100 cartoons (n), five subject matter categories (m) for characterizing the cartoons (monster, villains, fairy tales, outer space, and musical numbers), two category selections (x) by the viewer, one quantitative ratings criteria (p) (funny level) possessing three quantitative rating levels (y).

The database must include one or more cartoons that are categorized so that any combination of viewer choices returns at least one cartoon.

It is therefore an object of the present invention to provide a system and method that use a graphical viewer interface for selecting video pieces available over an interactive network, such as cartoons, from a database of video pieces subjectively characterized with respect to subject matter.

It is another object of the present invention to provide a system and method that use a graphical viewer interface for selecting video pieces available over an interactive network, such as cartoons, from a database of video pieces where the graphical viewer interface has icon control elements that represent categories that are used to characterize subjectively the subject matter content of the video pieces in the database.

It is another object of the present invention to provide a system and method that use a graphical viewer interface for selecting video pieces available over an interactive network, such as cartoons, from a database of video pieces where the graphical viewer interface has quantitative control elements that represent quantitative ratings for subject matter criteria, which quantitative ratings are used to characterize subjectively the subject matter content of the video pieces in the database.

It is another object of the present invention to provide a system and method that use a graphical viewer interface for selecting video pieces available over an interactive network, such as cartoons, from a database of video pieces where the graphical viewer interface has button control elements that initiate, reset, or terminate the search process for selecting one of the video pieces in the database.

These and other objects, features, and advantages of the present invention may be more clearly understood and appreciated from a review of the following detailed description and by reference to the appended drawings and claims.

BRIEF DESCRIPTION OF THE DRAWINGS

FIG. 5 is a representation of a graphical viewer interface display used in connection with the present invention which shows one of the icon control elements in transition as a result of being selected and activated by a user.

FIGS. 6A and 6B are tables showing the organization of the database of available video pieces of the present invention.

FIG. 7 is a logical flow diagram of the operation of the graphical viewer interface for selecting a video piece in accordance with the present invention.

DETAILED DESCRIPTION OF THE PREFERRED EMBODIMENT

Figure 1:
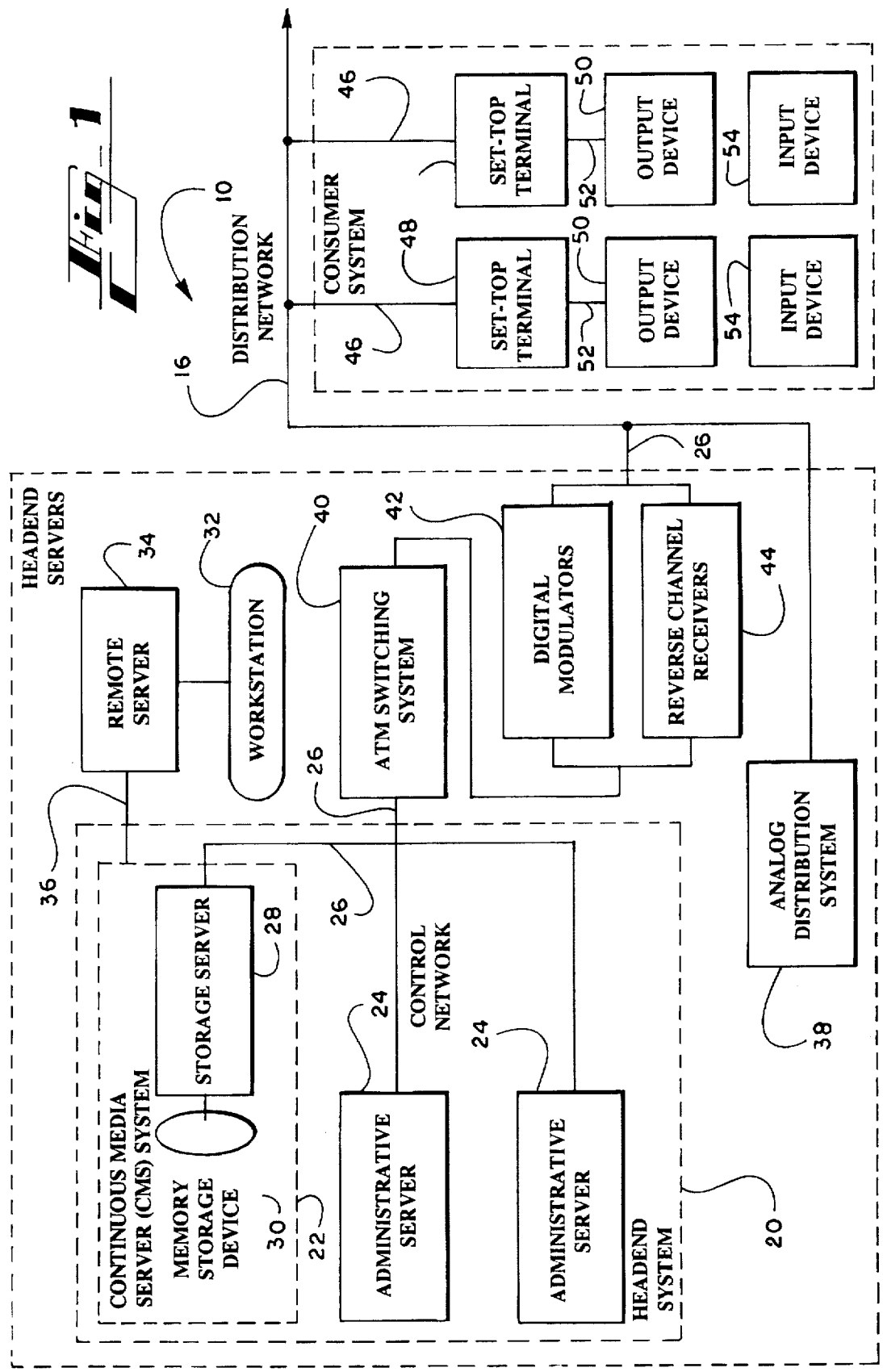
FIG. 1 is a block diagram of the components of an interactive television network system used in connection with the preferred embodiment of the present invention.

The preferred embodiment of the present invention is directed to systems and methods in an interactive network system which use a graphical viewer interface for selecting video pieces, such as cartoons, on the basis of the subject matter content of the video pieces. The interactive network can deliver a variety of services to a subscriber, including entertainment, information, and transaction services, to consumers via an interactive broad band network. The preferred system of the present invention, which is referred to as a video on demand system, allows a subscriber to select and view video pieces, such as cartoons, provided by the interactive network. The system of the present invention uses a graphical viewer interface to enable the viewer to select video pieces based on the characterized subject matter content of the video pieces available to subscribers over the interactive network. The interactive network maintains a database in which the available video pieces are subjectively categorized and quantitatively rated with respect to subject matter content. The graphical viewer interface has icon control elements which represent the categories stored in the database for each available video piece. The graphical interface also has quantitative control elements that relate to the quantitative ratings of the subject matter of the video pieces. By activating one or more of the control elements, the viewer can select one or more video pieces that conform to the categories and quantitative ratings of the video pieces.

Although the preferred embodiment will be generally described in the context of an interactive television system for delivering broadcast television programs, particularly cartoons on demand, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Turning first to the nomenclature of the specification, the detailed description which follows is represented largely in terms of processes and symbolic representations of operations by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now the drawings, in which like numerals represent like elements throughout the several figures, the present invention and the preferred operating environments will be described.

The Operating Environment

A typical CATV system for the delivery of television programming to subscribers comprises three main elements: a headend, a distribution system, and subscriber drops.

The "headend" is a signal reception and processing center that collects, organizes and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes the these signals to individual neighborhoods for delivery to subscribers. A modern distribution system typically comprises a combination of coaxial cable and optical fibers with trunk amplifiers periodically spaced to compensate for attenuation of the signals along the line.

"Subscriber drops" are taps in the distribution system that feed individual lines into subscribers' television sets or subscriber set-top terminals, often referred to as "subscriber premises equipment" or "customer premises equipment" ("CPE").

Referring to FIG. 1, an interactive network system 10 includes a headend system 12 for delivering programming information to and receiving instructions from a consumer or user system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a world-wide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data, such as audio and video. On-demand access of digitized data is a particularly desirable characteristic of the CMS system 22 because it allows the interactive network to support the on-demand delivery of various types of programming, such as music, movies, cartoons, etc. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bi-directional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically includes both video and audio signals. Programming information can be delivered in digital format, analog format, or a combination of both analog and digital formats. For the preferred embodiment, video pieces, such as cartoons, are delivered as an analog signal. By contrast, requests or instructions issued by viewers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributed by the headend system 12 and to (2) transmit requests or instructions to the headend system 12. For example, the set-top terminal 48 can accept and convert signals carrying programming information to a format compatible for presentation by an output device 50, such as a television or a computer system. The output device 50 includes a display screen 95 on which is displayed a graphical viewer interface display 100 (FIG. 2) in accordance with the present invention. This output device 50, which can connected to the set-top terminal via a conductive path 52 such as coaxial cable, preferably includes a receiver and a display or monitor for receiving and displaying video pieces, including cartoons, and related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a displayed object presented by the output device or to enter text for conducting a service-related transaction supported by the interactive network 10. The input device 54 can be implemented as one or more devices for inputting data, including a hand held control, a keyboard, a mouse device, a game control, a joystick, a pen or stylus, a trackball, or a track pad.

For the preferred embodiment, the input device 54 is implemented as a hand held remote control unit capable of transmitting infrared signals carrying commands for controlling the operation of the set-top terminal 48. The remote control unit can include a directional keypad having distinct keys for allowing the user to control direction (up, down, left, right) and relative changes in volume or channel (increase or decrease), as well as absolute changes to channel value via a numeric key pad. The remote control unit and its functions are more fully described in conjunction with FIG. 3.

Figure 2:
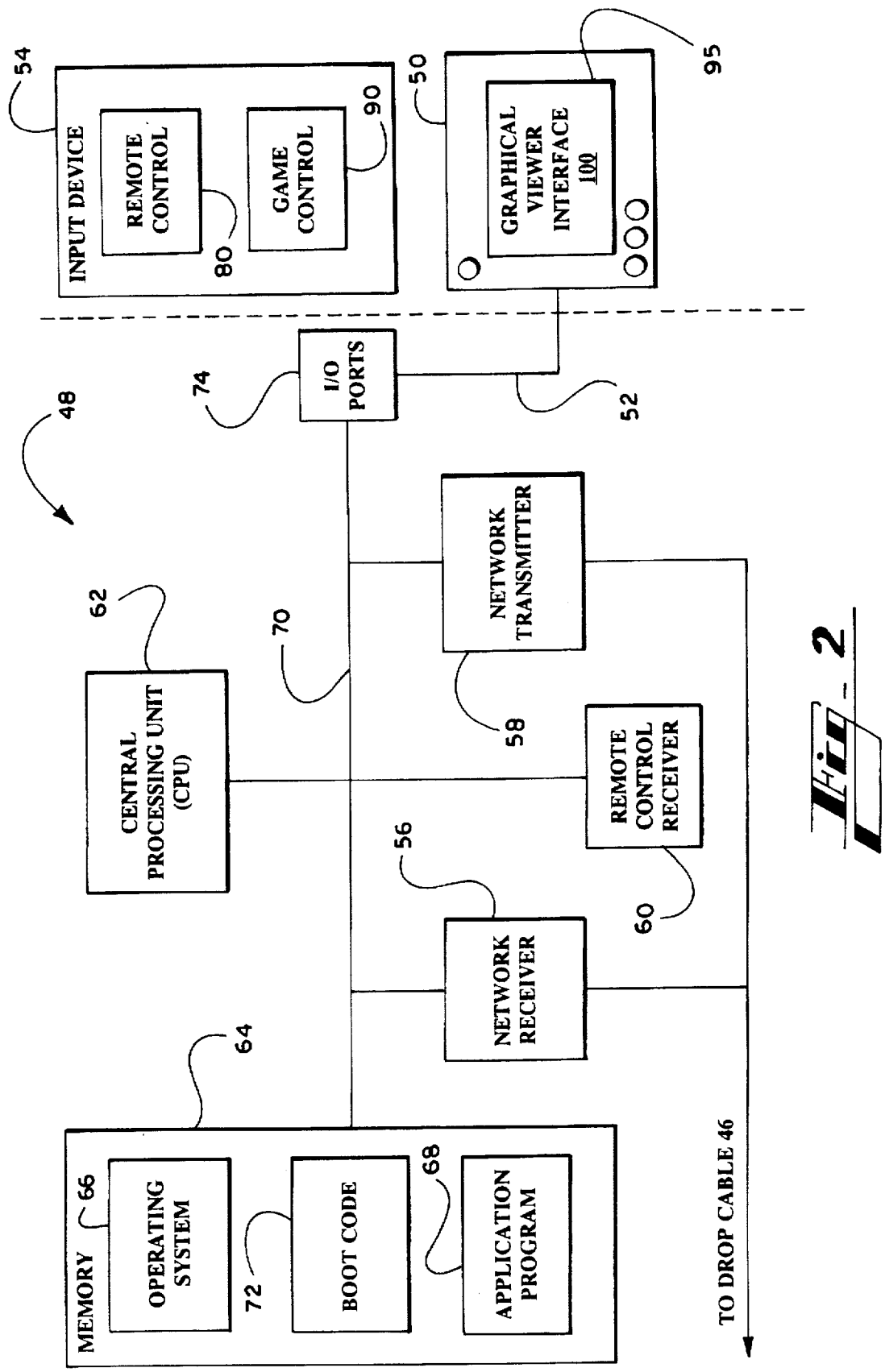
FIG. 2 is a block diagram of a set-top terminal used in connection with the preferred embodiment of the present invention.

FIG. 2 illustrates the basic components of the set-top terminal 48. The primary components of the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 54, such as a remote control unit 80.

The CPU 62, which is connected to the network receiver and transmitter 56 and 58, as well as to the remote control receiver 60, controls the operations of the set-top terminal 48 and supports the rendering of graphical images that form a part of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive viewer interface. For example, a microprocessor may be dedicated to control operations associated with the bi-directional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control elements that visually represent control functions of the operating system and other program modules. A control element is any visual image that can be manipulated by the user to perform an operation. The operating system 66 can receive and interpret input data supplied by the input device 54, as received by the remote control receiver 60. As described in more detail below, a user can "select" and "launch" or "activate" control elements by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control unit 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control unit 80. In this stand-by mode, the set-top terminal can communicate with the headend system and can respond to administrative requests transmitted by the headend system 12. In the event that a user tunes to an interactive channel (typically by pressing the appropriate function key of the remote control unit), the set-top terminal 48 changes modes and enters the active mode. In the active mode, the set-top terminal 48 communicates with the headend system 12 to process the instructions transmitted by the remote control unit. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display 50.

Figure 3:
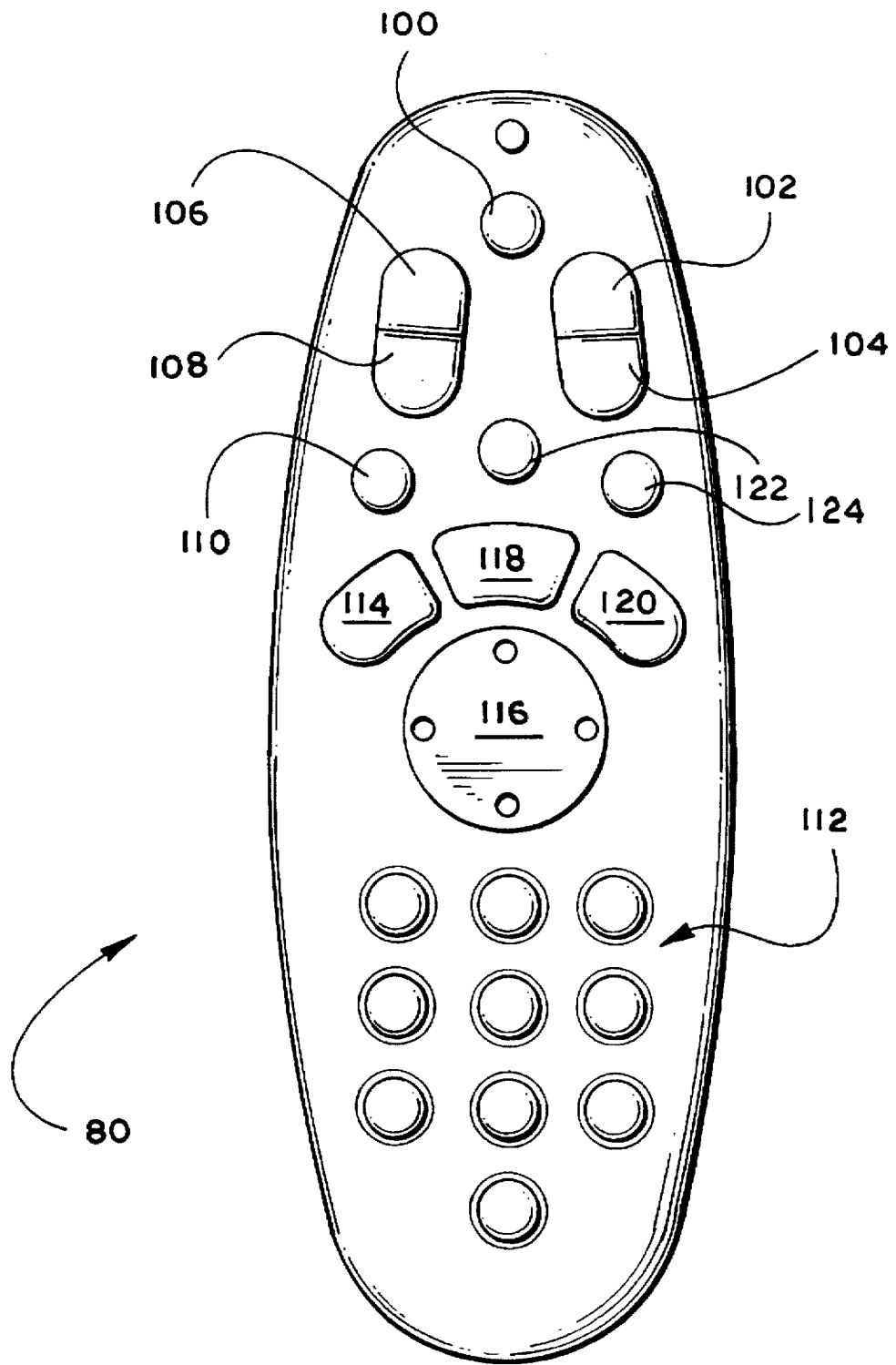
FIG. 3 is the preferred remote control unit for use with the set-top terminal of FIG. 2.

FIG. 3 illustrates the preferred remote control unit 80, which is used to transmit commands to the set-top terminal 48. The remote control unit 80 includes a variety of keys that are common to remote control units for use with conventional television sets. These include power on/off 101, channel up 102, channel down 104, volume up 106, volume down 108, mute 110, and a 10 digit numeric keypad 112.

The preferred remote control unit also includes keys that are specifically related to preferred interactive system. A menu button 114 is used to open and close on-screen menus, such as a channel manger object. A directional control 116 is a rocker switch that is used to manipulate the channel manager and select specific items by moving a cursor up, down, left or right. An action button 118 is used to launch or activate a selected function. A help key 120 is used to initiate on-screen help. An "A" button 122 and "B" button 124 are used to select specific options that are provided in some contexts.

The Preferred Systems and Methods For Selecting Cartoons Based on Subject Matter Content Turning now to FIGS. 4–7, the preferred systems and methods for selecting cartoons based on subject matter content will be described. The primary features of the present invention are a database of cartoons characterized by categories of subject matter content and by quantitative ratings of subject matter criteria and a graphical viewer interface with one or more control elements. The control elements include icon control elements that represent categories of subject matter found in the cartoons and quantitative control elements (sliders, dials or switches) that indicate the quantitative ratings of criteria found in the cartoons. The graphical viewer interface also includes the remote control which selects and activates the control elements.

Figure 4:
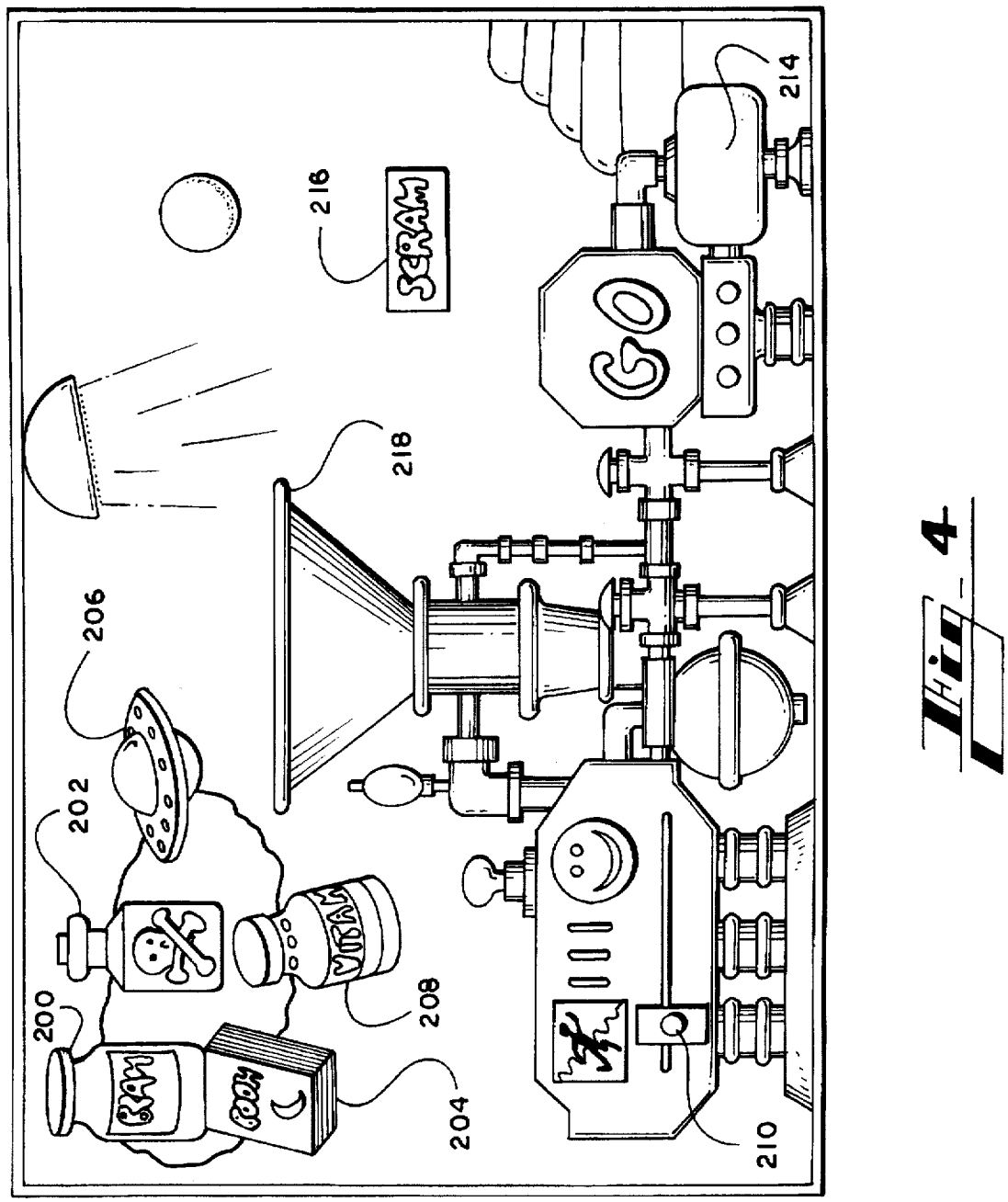
FIG. 4 is a representation of a graphical viewer interface display used in connection with the present invention which shows a set of control elements prior to selection by a user.

FIGS. 4–5 illustrate screen displays of the graphical viewer interface employed in the preferred embodiment of the present invention. FIGS. 6A–6B illustrate the database used in connection with the selection process for the cartoons. FIG. 7 is a flow chart for describing the operation of the graphical viewer interface of the present invention.

The Graphical Viewer Interface

Turning to FIGS. 4–5, the illustrated screen displays are reproduced on graphical viewer interface display 100 (FIG. 2). The graphical viewer interface is used to select a cartoon from an assortment of cartoons available over the interactive network. The screen displays make up part of the graphical viewer interface and are stylized to pique the imagination of children who are the likely users of the present invention. A person of ordinary skill will readily appreciate that alternative screen display designs may be used in connection with the present invention. The screen display illustrated in FIGS. 4-5 has control elements that allow the viewer to control the operation of the cartoon selection process. For the preferred embodiment of the present invention, the control elements illustrated in FIGS. 4-5 include category selection icons 200, 202, 204, 206, and 208, quantitative rating slider 210, go button 212, reset button 214, and scram button 216. The graphical viewer interface display also includes a mixer 218 into which an icon is placed when the icon is selected and activated by the viewer. The particular category selection icons illustrated are brain in a jar icon 200, villain potion icon 202, fairy tales icon 204, UFO icon 206, and musical vitamins icon 208. The slider 210 is illustrated as a funny level slider. A person of ordinary skill in the art will understand that additional or different category icons could be provided. Moreover, the quantitative rating criteria slider could be eliminated, or it could relate to a different quantitative criteria or additional quantitative rating criteria sliders could be provided.

The viewer may select and activate the control elements using the directional control and action button on the remote control unit (FIG. 3). Use of the directional control on the remote control unit causes the focus to skip from control element to nearest control element in a "tab" mode. A control element is thus selected by moving the focus to the control element. The focus is analogous to a cursor on a general purpose computer, and may be represented by a highlighted or colored frame or border that appears around a control element or by the control element changing color or appearance. The category selection icons 200-208 flash when they have focus for example. The quantitative rating criteria (funny level) slider and buttons may illustrate focus in a number of ways which will focus the attention of the viewer on those control elements. Focus indicators actually used in an interactive television system may include multiple visual and sound cues. The focus indicator may appear in a variety of forms external to the control item, or may appear as a change in appearance of a control item, or may appear as a combination thereof. The focus indicator may also have associated sounds such as a sliding sound followed by a "doink" sound played in association with a change in focus.

The Cartoon Database

The cartoon selection system of the present invention relies on a database of cartoons maintained at the continuous media server 22 (FIG. 1). The database is constructed around the illustrated embodiment of the present invention in which approximately 100 cartoons (n=100) are available from the server 22. In addition, five categories (m=5) are used to characterize the subject matter of the cartoons available on the server 22. Each of the five categories is represented by one of the icons 200-208. The viewer is allowed to select and activate only two of the icons 200-208 (x=2) when selecting a cartoon. The illustrated system is also limited to a single quantitative rating criteria (p=1), funny level, and that criteria is specified at three levels of funniness (y=3) by the slider 210. A person of ordinary skill will appreciate that different values for n, m, x, p, and y may be adopted for the cartoon selection system and method of the present invention and that the specified values are merely for the purposes of illustration of the present invention.

In order to provide a satisfying experience, the cartoon selection system should match as closely as possible the criteria input by the user. Therefore, the number of cartoons should allow for as complete a cross-section of the total inputs as possible. The search mechanism requires that at least one icon element match, as well as the quantitative inputs. Thus, the equation relating the number of cartoons to the input is:

$$N \geq m \times \prod_{i=1}^{p} y_i$$

where n is the number of cartoons, m is the P number of icon elements, p is the number of quantitative categories, and $y_i$ is the number of levels for quantitative category L. The number of choices made by the user is not important because a match can still be found if only one of the database categories matches the input categories. Additional matches only serve to narrow the list of results and provide a cartoon that more closely matches the wishes of the user. If the quantitative categories (p) are dropped, then the equation is much simpler: $N \geq m$.

For the illustrated system of the present invention, the database constitutes two tables: Table A is illustrated in FIG. 6A, and Table B is illustrated in FIG. 6B. Table A has a record for each of the cartoons available over the interactive network. As illustrated, each record includes the cartoon identification number 1-100, the cartoon name, category 1, category 2, and quantitative criteria rating (funny level) (rating of 0,1, or 2).

Table B has a record of each of the five categories (icons) by which cartoons are characterized and then selected. Each category record in Table B includes a category identification number 0-4, a category name, a description of the nature of the category, and a graphics designator to point to a file that generates the display for the icon that represents the category.

In connection with the illustrated embodiment, the cartoon "Jumpin Jupiter" contains category "0" denoting monsters and category "3" denoting outer space. Also on a scale of 0-2, "Jumpin Jupiter" is very funny with a "2" funny level rating. Therefore, if the view selects the brain in a jar icon (category ID "0"), the UFO icon (category ID "3"), and sets the slider 210 to the right, the system of the present invention will select "Jumpin Jupiter" as one of the cartoons for viewing.

The categorization and quantitative rating of the cartoons in the database are done subjectively by an editor. The resulting subjective characterization of the cartoons provides a rough cut for selecting cartoons for viewing. However, automation may be used to further characterize cartoons so that all possible selections that the viewer can make will result in at least one cartoon that matches the categorization derived from the viewer selection. The invention does not contemplated that fine distinctions in the editing process are either necessary or desirable.

Operation Of The Cartoon Selection System

FIG. 7 is a flow diagram that summarizes the operation of the cartoon selection system in connection with the graphical viewer interface. Before the method begins at step 700, the viewer must have selected the appropriate interactive channel and selected the cartoons on demand service from the menu of the interactive network. The computer-implemented method illustrated in FIG. 7 may be executed within the headend system, within the set-top terminal, or within a combination thereof. The cartoon selection system proceeds to step 702 where an introductory or instructional animation is played for the viewer. After the animation is played at step 702, the method then loads and displays the graphical viewer interface display as shown in FIG. 4, and the focus is set to the first icon 200, brains in a jar. By using the directional control 116 on the remote control, the viewer can tab from icon to icon at step 706, to slider 210 at step 708, to go button 212 at step 710, to reset button 214 at step 712, or to scram button 216 at step 714.

With the focus set on one of the icons 200-208 at step 706, the viewer can activate the icon with focus. At step 716, the activated icon (villain potion 202), which represents one of the selection categories, is moved into the mixer 218 (FIG. 5). Activation of an icon at step 716 means that the cartoon selection process has identified one of the search categories that will be used at step 726 when the search is subsequently initiated by the go button (step 710). From step 716, the method proceeds to step 718. If at step 718 the method determines that the activated icon is the first selection, the method follows the "yes" branch to step 722. At step 722, the reset button 214 is enabled, and the method proceeds to decision step 721. Once the reset button is enabled at step 722, the viewer can shift focus to the reset button at step 712 and reset the method at step 728. Resetting the process at step 728 removes all icons from the mixer 218, and the icon selection process at steps 706 and 716 can be started again.

If at decision step 721 the method determines that the selected icon was not the last of the possible selections of icons, the method follows the "no" branch and returns to step 706 for setting the focus on the next icon and then to step 716 for activating the next icon.

After selection and activation of the second icon representing the second selection category, the method proceeds to step 718 and follows the "no" branch to step 721. If at step 721 the method determines that the second selected icon is the last allowed selection, the method follows the "no" branch to step 720, the method disables the remaining icons that have not been moved to the mixer 218.

At step 708, the focus is moved to the quantitative rating slider 210. The method then proceeds to step 724 where the viewer can manipulate the slider to set the funny level for the subsequent search at step 726. The position of the slider 210 is used at step 726 to identify the selected funny level rating for the search of the cartoon database.

With two icons moved to the mixer and with the slider positioned, the search for a cartoon is initiated by moving focus to the go button and activating it with the remote control at step 710. At step 711, the method checks to determine if at least one icon is in the mixer 218. If there is no icon in the mixer, the method follows the "no" branch and proceeds to step 713. At step 713, the method randomly selects one icon and puts it into the mixer. After randomly selecting one icon at step 713 the method proceeds to step 726. If at step 711 the method determines that there is at least one icon in the mixer, the method proceeds directly to step 726. At step 726, the method then searches the database for one or more cartoons that match the search categories and funny level rating. If more than one cartoon is found, the method randomly selects one of the cartoons from the list of cartoons that were found as a result of the search. Other methods for picking one of the cartoons from the list of found cartoons could be used if desired.

After the selection is complete at step 726, the method may display the identity or a short preview of the cartoon in order to allow the viewer a chance to reject the selected cartoon at step 734. If at step 734 the viewer rejects the proffered cartoon by selecting and activating the reset button, the method follows the "no" branch to step 736. At step 736, the icons are all removed from the mixer 218 so that the icon selection process can begin again at step 706. Alternatively, if the viewer is satisfied at step 734 as a result of the preview and the viewer has taken no action within a designated time period, the method follows the "yes" branch to step 738. At step 738, the selected cartoon is retrieved from the server 22 and played. The method ends at step 740.

During the selection process of icons and setting of the slider, the graphical viewer interface display, including the mixer 218, preferably is animated in some fashion to indicate that the mixer is ready to process the viewer's request. Vibration of the mixer and low rumbling noises are possibilities. Once the mixer 218 has been loaded with icons and the go button has been activated, the intensity of the animation preferably increases to signify that the mixer 218 is processing the request.

At any time during the selection process, the viewer has the option of focusing on and activating the scram button 216 at step 714. By activating the scram button at step 714, the method moves to step 730 where the method returns the viewer to a higher level interface associated with the interactive television system, such as an electronic program guide from which the viewer may select among a plurality of applications. Activation of the scram button 216 at step 714 ends the cartoon on demand selection process at step 740.

What is claimed is:

1. In an interactive network having a headend server with an assortment of video pieces stored thereon, a user system for receiving video pieces and having a graphical viewer interface and an input device, and a network connection therebetween, a system for selecting a video piece from the assortment of video pieces available over an interactive network for viewing by a user, the system comprising:

a. a database of video pieces wherein each video piece in the database is characterized by categories relating to the subject matter content of the video piece;

b. a set of icon control elements displayed by the graphical viewer interface, each icon control element being associated with each of the categories, and each icon control element being selectable by acquiring focus from the input device; and c. selection means for selecting at least N video pieces from the assortment of video pieces in response to a user activating at least one of the icon control elements by means of the input device, wherein each video piece in the database is further characterized by quantitative criteria relating to the subject matter of the video piece and the icon control elements are further associated with the quantitative criteria, and wherein the assortment of video pieces is n, the number of categories is m, the number of quantitative criteria is p, and the quantitative criteria has y levels and wherein $$N \geq m \times \prod_{i=1}^{p} y_i.$$

2. In an interactive network having a headend server with an assortment of video pieces stored thereon, a user system for receiving video pieces and having a graphical viewer interface and an input device, and a network connection therebetween, a method for selecting a video piece for viewing by a user comprising the steps of:

a. characterizing the video pieces based on categories relating to the subject matter content of the video piece, wherein the step of characterizing further includes assigning quantitative criteria to each video piece in the database relating to the subject matter of the video piece and the step of displaying further includes displaying icon control elements that are associated with the quantitative criteria;

b. displaying a set of icon control elements each of which is associated with one of the categories;

c. focusing on at least one of the icon control elements by means of the input device; and d. selecting at least X1 video pieces from the assortment of video pieces in response to a user activating at least one of the icon control elements by means of the input device, wherein the assortment of video pieces is n, the number of categories is m, the number of quantitative criteria is p, and the quantitative criteria has y levels and wherein $$N \geq m \times \sum_{i=1}^{p} y_i.$$

* * * * *

UNITED STATES PATENT AND TRADEMARK OFFICE
CERTIFICATE OF CORRECTION

PATENT NO. : 5,678,012

DATED : October 14, 1997

INVENTOR(S) : Jon B. Kimmich et al.

It is certified that error appears in the above-identified patent and that said Letters Patent is hereby corrected as shown below:

In column 17, line 7, please delete [XI] and insert in place thereof --N--

In column 18, line 4, please delete the formula given and insert in place thereof $$-- \quad N \geq m \times \prod_{i=1}^{p} y_i \quad --$$

Signed and Sealed this

Sixteenth Day of February, 1999

Attest:

Attesting Officer

*Acting Commissioner of Patents and Trademarks*